Sept. 25, 1962

A. R. PETERSON 3,056,018

WELDING APPARATUS

Filed Nov. 14, 1960

INVENTOR.
Allen R. Peterson.
BY
Harness, Dickey & Pierce
ATTORNEYS.

Sept. 25, 1962
A. R. PETERSON
3,056,018
WELDING APPARATUS
Filed Nov. 14, 1960
7 Sheets-Sheet 2
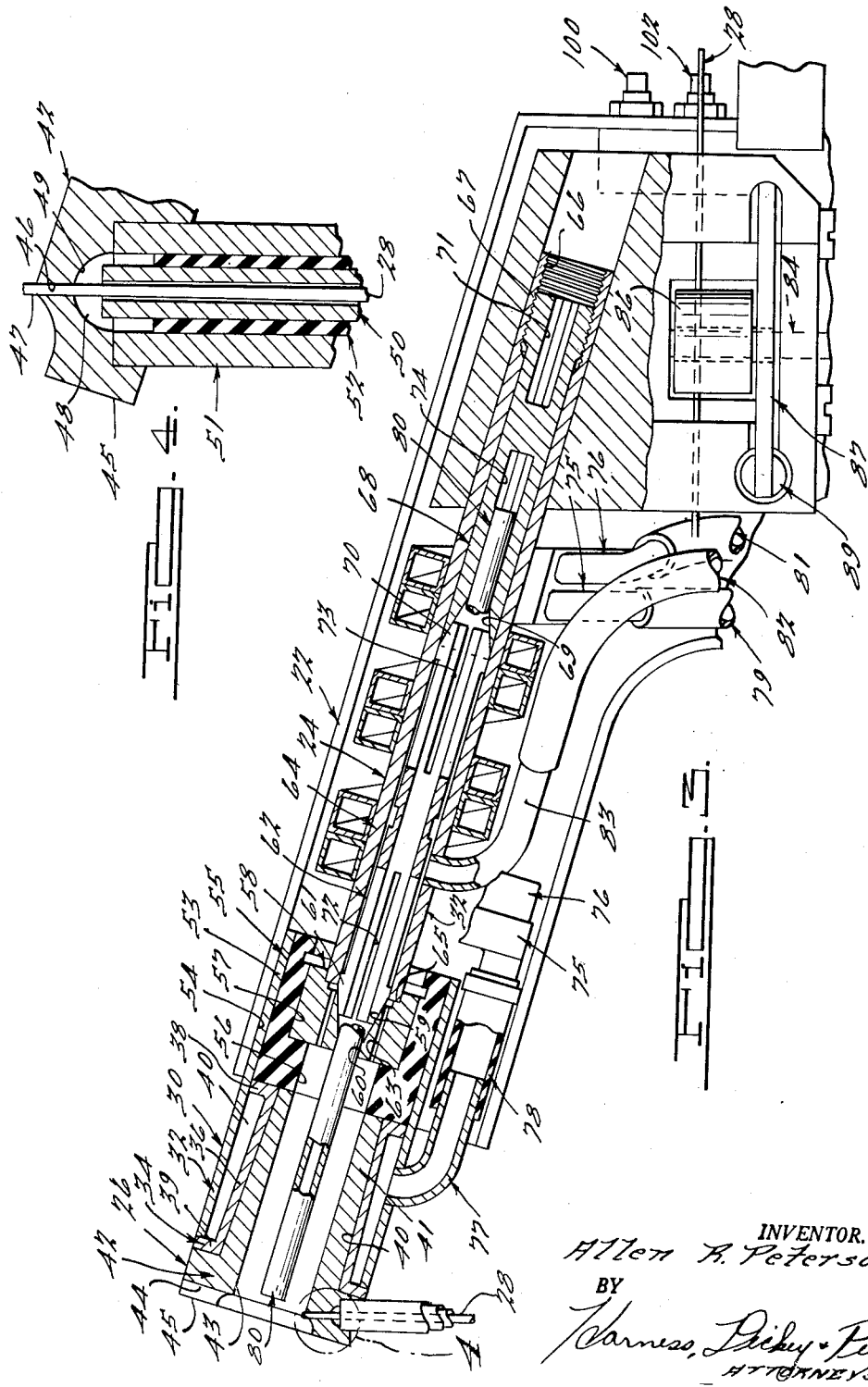
INVENTOR.
Allen R. Peterson
BY
Harness, Dickey & Pierce
ATTORNEYS

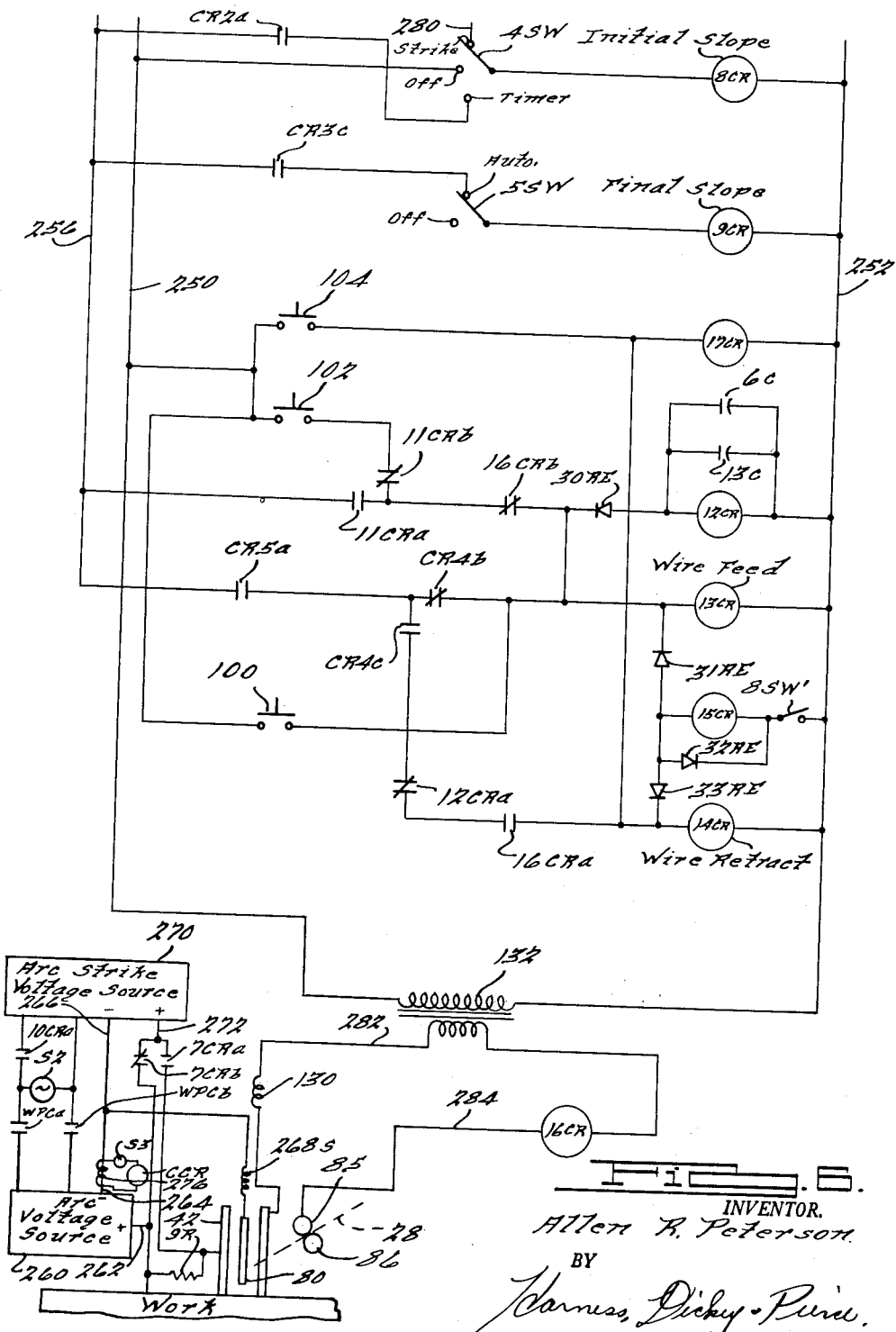

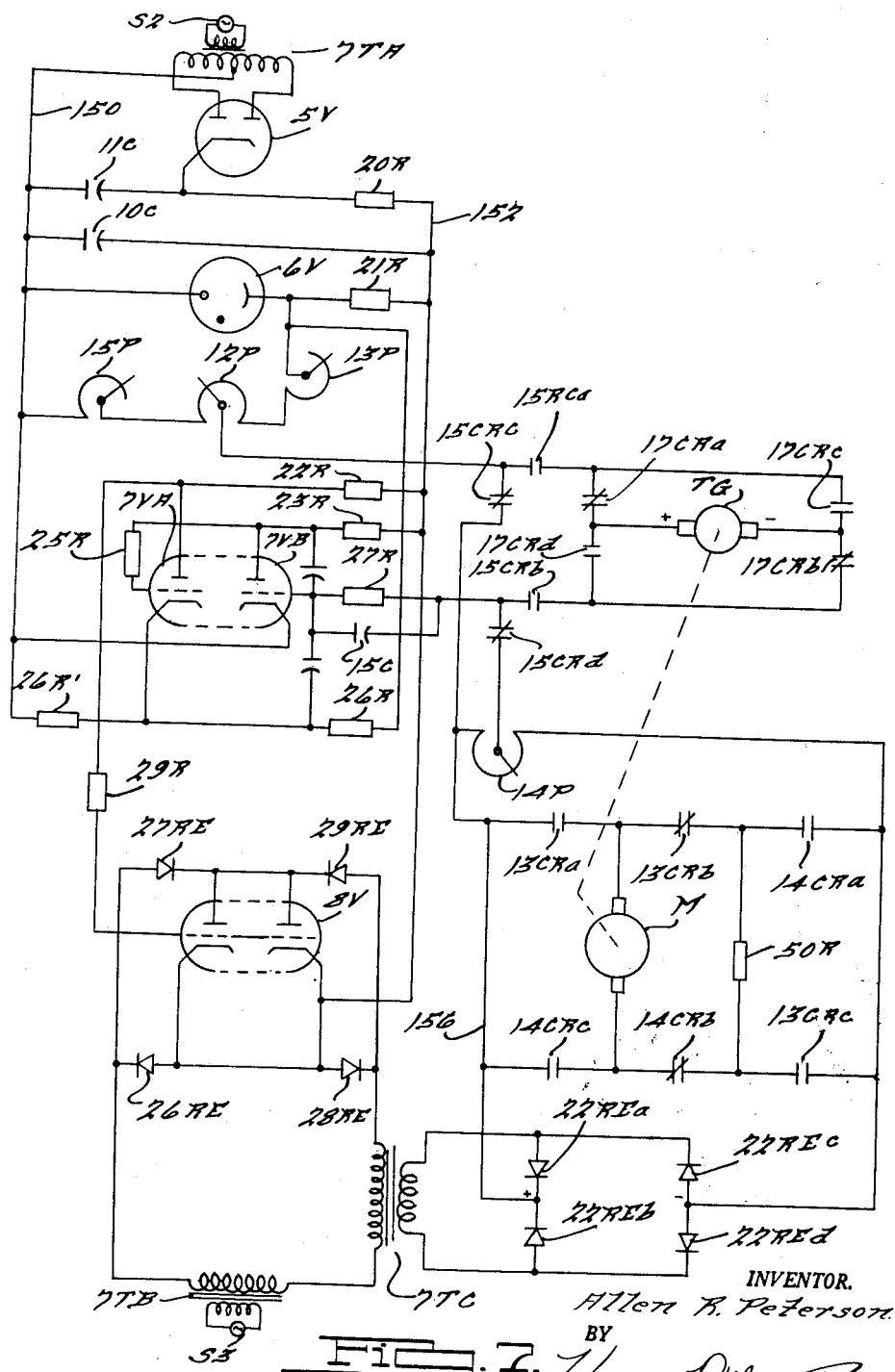

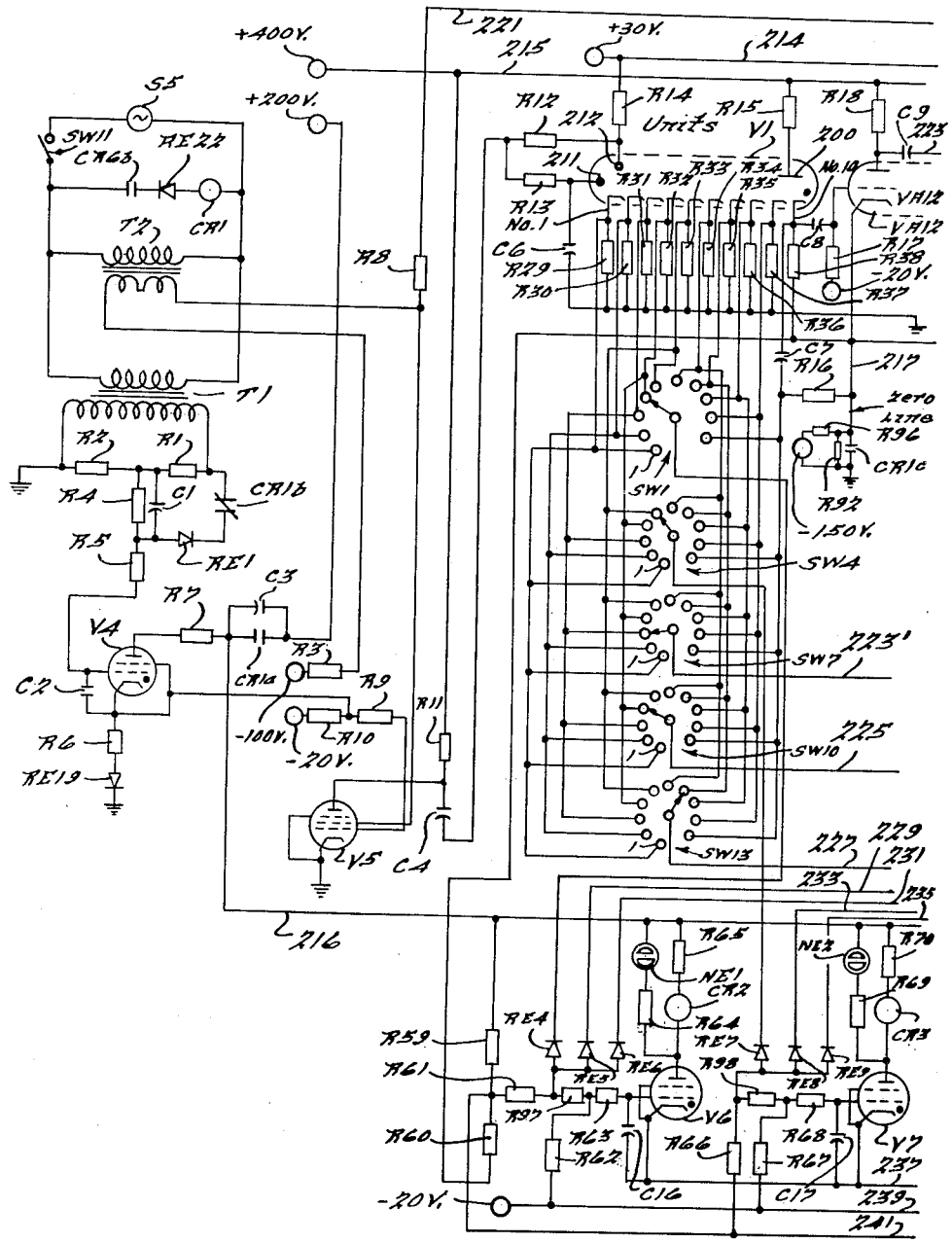

United States Patent Office 3,056,018
Patented Sept. 25, 1962

3,056,018
WELDING APPARATUS
Allen R. Peterson, Dearborn, Mich., assignor to Weltronic Company, Detroit, Mich., a corporation of Michigan
Filed Nov. 14, 1960, Ser. No. 69,183
17 Claims. (Cl. 219—130)

This invention relates generally to welding apparatus and more particularly to arc welding apparatus wherein a predetermined amount of filler wire is automatically fed into the fusion zone of a weld during each welding cycle.

An object of this invention is an improved arc welding apparatus.

Another object of this invention is to minimize the physical size of arc welding apparatus having provision for the feeding of filler wire into the fusion zone of a weld.

Another object is arc welding apparatus having an improved means for holding a nonconsumable electrode.

Another object of this invention is to improve the nozzle construction for arc welding guns to facilitate feeding of the filler wire into the weld puddle in a manner to improve weld integrity.

Another object of this invention is to establish the location of the tip of the filler wire in arc welding equipment.

Another object of this invention is an improved means for electrically isolating the filler wire from the metallic nozzle of an arc welding gun.

Other objects and advantages of the present invention will be apparent in the following specification, claims and drawings wherein:

FIG. 4 is an enlarged fragmentary cross sectional view of the structure within the circle 4 of FIG. 3;

FIG. 5 is a schematic representation of a portion of the control circuit for the welding apparatus;

FIG. 6 is a schematic representation of another portion of the control circuit for the welding apparatus;

FIG. 7 is a schematic representation of a motor speed control circuit for the wire feed motor;

FIG. 8 is a schematic representation of a portion of a timer suitable for use in cooperation with the circuits of FIGS. 5, 6 and 7.

Figure 1:
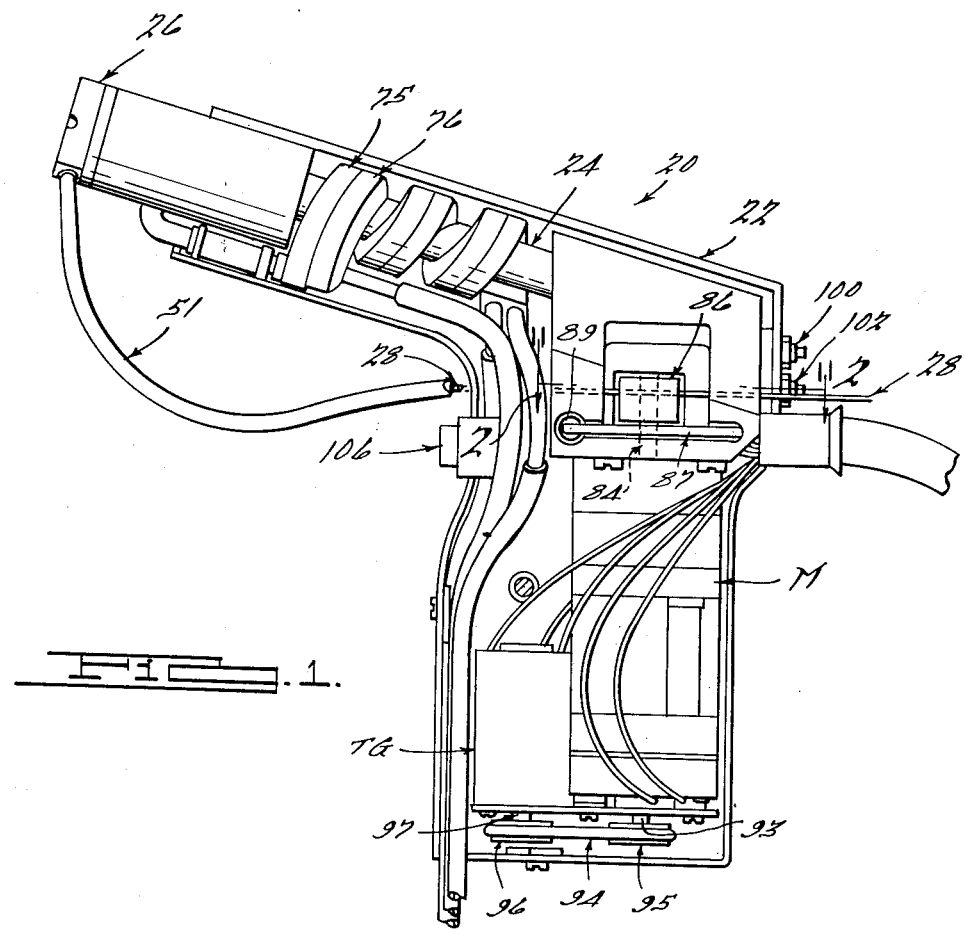
FIGURE 1 is a side view of an arc spot welding gun, in accordance with an exemplary embodiment of the present invention, with one-half of the insulating enclosure thereof removed to show the internal construction of the gun.

Referring now to FIGURE 1 of the drawings, an arc welding gun 20, in accordance with an exemplary embodiment of the present invention, comprises a housing 22 of insulating material, for example, an epoxy resin reinforced with fiberglass. The housing 22 includes a complementary cover (not shown) whereby the components of the gun 20 are enclosed in substantially sealed relationship. The housing 22 of the gun 20 encloses a collet assembly 24, a nozzle assembly 26, a drive motor M that feeds and retracts a filler wire 28 into and from the fusion zone of a weld, and a tachometer generator TG for controlling the speed of the motor M.

Figure 3:
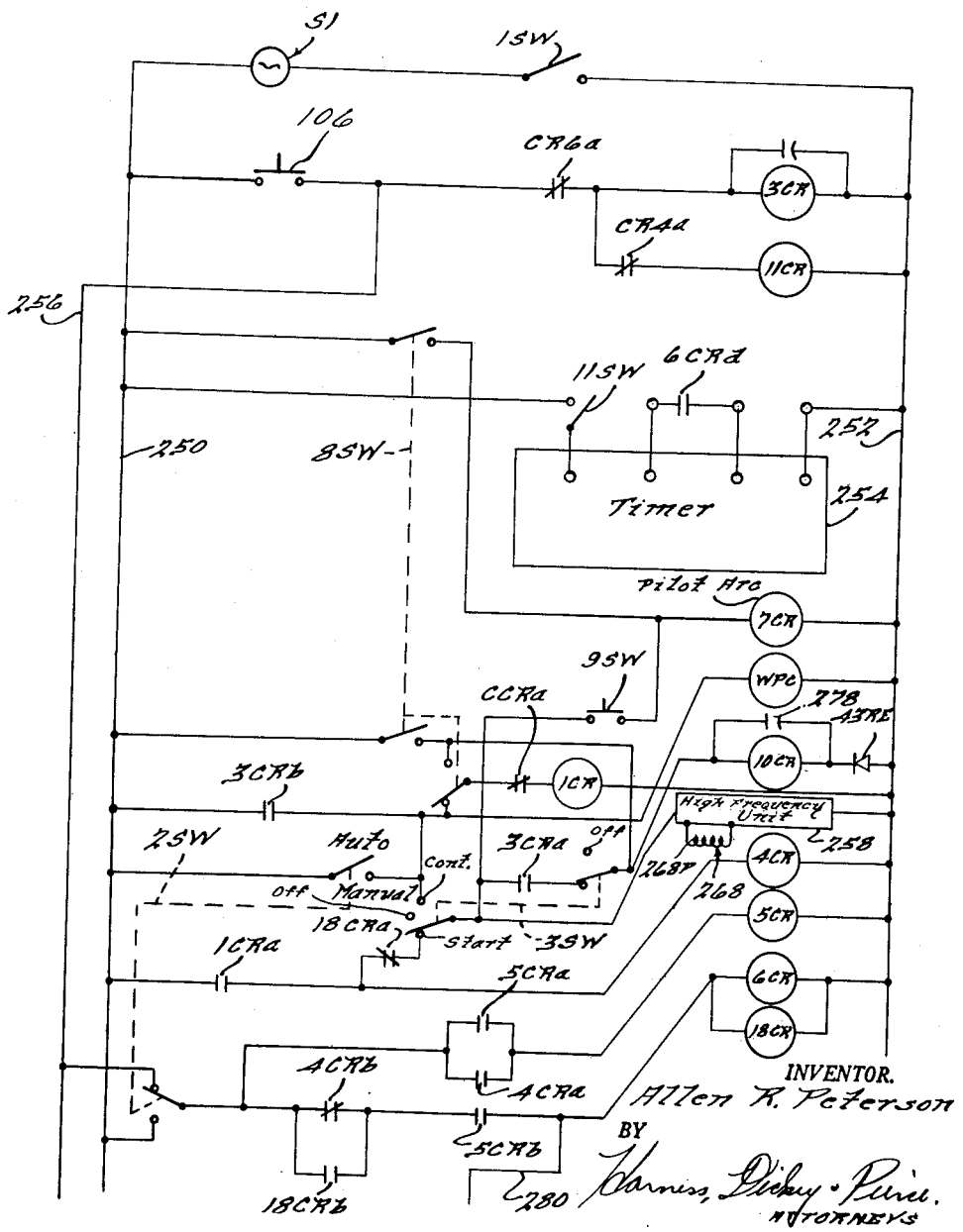
FIG. 3 is a view similar to FIGURE 1, shown partially in cross section and enlarged for clarity.

Referring now to FIG. 3, the nozzle assembly 26 includes a heat sink 30 comprising a tubular member or sleeve 32 and a nozzle seat 34. The sleeve 32 is spaced from an inner peripheral wall 36 of the nozzle seat 34 by a radially outwardly extending rear end flange 38 and by a front end flange 39, so that the sleeve 32, in conjunction with the inner peripheral wall 36 and the flanges 38 and 39 of the nozzle seat 34 define an annular cooling chamber 40 for the circulation of cooling water through the heat sink 30 thereby to conduct heat away from the nozzle assembly 26.

The inner peripheral wall 36 of the nozzle seat 34 is of frusto conical longitudinal cross section thereby to define a seat 40 for the acceptance of a complementary frusto conical tubular end portion 41 of a nozzle tip 42. The nozzle tip 42 has a central bore 43 for the acceptance of a nonconsumable electrode 80 in electrically spaced relationship, as will be described. The nozzle tip 42 has a plurality of radially outward directed grooves 44 in a frontal face 45 thereof to facilitate the passage of inert gases radially outwardly when the nozzle tip 42 is pressed against a workpiece (not shown).

In accordance with one feature of the present invention, the filler wire 28 is fed into the weld puddle, developed generally centrally of the nozzle tip 42 in the surface of the workpiece (not shown), through a bore 46 in the nozzle tip 42 (FIG. 4). In a preferred constructed embodiment, the bore 46 is oriented at an angle of approximately 15 degrees with respect to the plane of the frontal face 45 of the nozzle tip 42. As will be discussed hereinafter, the position of the end portion 47 of the filler wire 28 must be positively controlled at all times, an electrical circuit being closed at all times that the filler wire 28 is within the bore 46 of the nozzle tip 42 thereby to positively control the amount of filler wire 28 fed into the weld puddle during each welding cycle.

The filler wire 28 is retracted from the weld puddle after feeding of a predetermined length or increment thereof into the weld puddle, retraction of the filler wire 28 from the bore 46 interrupting an electrical circuit when the tip 47 of the filler wire 28 backs out of the bore 46 and into an air gap 48 defined by a hemispherical recess 49 in the nozzle tip 42.

The wire 28 is supported in a stainless steel guide tube 50 and a metallic outer tube 51, an insulating tube 52 being interposed therebetween to electrically isolate the tube 50 and wire 28 from the outer tube 51 and nozzle tip 42. Thus, it will be seen that retraction of the end portion 47 of the wire 28 from within the bore of the nozzle tip 42 into the air gap 48 between the stainless steel sleeve 50 and nozzle tip 42 breaks the electrical continuity between the nozzle tip 42 and wire 28 to terminate a welding cycle, in a manner to be described.

Referring again to FIG. 3, an inner end portion 53 of the tubular member or sleeve 32 extends into a complementary aperture 54 in the housing 22 thereby to support the nozzle assembly 26 with respect to the housing 22. The inner end portion 53 of the tubular member 32 also supports an insulating collet seat support 55.

The collet seat support 55 has a bore 56 and counterbore 57 for the passage of the electrode 80 and for the seating of a collet seat 58, respectively.

The collet seat 58 has a truncated conical bore 59 therein terminating in a circular aperture 60, the conical bore 59 accepting a complementary conical end portion 61 of a collet 62 and the aperture 60 providing for the passage of the electrode 80 through the collet seat 58. The collet seat 58 has a plurality of circumferentially spaced and axially extending bores 63 for the passage of inert gas axially through the collet seat 58, as will be discussed hereinatfer.

A tubular barrel 64 is seated in a complementary counterbore 65 in the collet seat 58 for the acceptance and guidance of the collet 62. The barrel 64 has a threaded end portion 66 at the opposite end thereof for the acceptance of a complementary threaded end portion 67 of a collet retainer 68. The collet retainer 68 has a conical bore 69 at the opposite end portion thereof for the acceptance of a complementary conical end portion 70 on the collet 62. It is to be noted that rotation of the collet retainer 68 with respect to the barrel 64 effects relative axial movement therebetween thereby to bias the collet 62 axially of the barrel 64 against the conical bore 59 in the collet seat 58. Such rotation of the collet retainer is effected by insertion of a conventional Allen wrench into a complementary hexagonal recess 71 in the collet retainer 68. The collet retainer 68 has a similar hexagonal recess 74 at the other end thereof for the acceptance of the inner end of the electrode 80 and for the passage of inert gases, as will be discussed.

In accordance with another feature of the present invention, the collet 62 has a plurality of circumferentially spaced and axially extending slots 72 and 73 at the opposite ends 61 and 70 thereof to provide for radial contraction of the end portions 61 and 70. Because the end portions 61 and 70 are of conical configuration, the aforementioned advancement of the collet retainer 68, with the resultant movement of the end portion 61 into its complementary conical seat 59 and the advancement of the end portion 70 of the collet 62 into its complementary seat 69 in the collet retainer 68, results in the camming of the end portions 61 and 70 radially inwardly to positively grip the electrode 80 at two axially spaced points. In this manner, the nonconsumable electrode 80 is maintained in positive alignment with the nozzle assembly 26 and end portion 47 of the filler wire 28, warping thereof, with its inherent variation in electrical spacing, being virtually precluded.

A flexible tube 82 is connected to the barrel 64 through an elbow 83 and communicates with the interior thereof for the conduction of inert gases into the interior of the barrel 64 and outwardly of the collet seat 61 through the circumferentially spaced axially extending bores 63 therein, thence axially outwardly along the nonconsumable electrode 80, thence radially outwardly through the grooves 44 in the frontal face 45 of the nozzle tip 42. When, in some applications, it is desired that there be a flow of inert gas internally of the electrode 80, a hollow electrode is provided. Flow into the hollow electrode is accommodated by the hexagonal configuration of the recess 74 in the collet retainer 68.

Cooling of the collet assembly 54 and nozzle assembly 26 is effected by a flow of water or other suitable fluids through a pair of metallic conduits 75 and 76, of generally rectangular transverse cross section to maximize the heat transfer capabilities thereof with respect to the barrel 64. The conduits 75 and 76 are connected to the annular cooling chamber 40 within the heat sink 30 by a pair of forwardly extending connecting elbows 77 (one of which is shown), through a pair of insulating tubes 78. It is to be noted that the insulating tubes 78 interposed between the tubes 75 and 76, the elbows 77 of the nozzle seat 34, electrically insulate the nozzle assembly 26, including the heat sink 30 and nozzle tip 42 from the tubes 75 and 76, barrel 64, collet 62 and electrode 80. A pair of flexible conduits 79 and 81 are connected to the tubes 75 and 76 for the conduction of the cooling medium to the gun 22 thereby rendering the gun 22 completely flexible and relatively easy to manipulate in cramped quarters.

Figure 2:
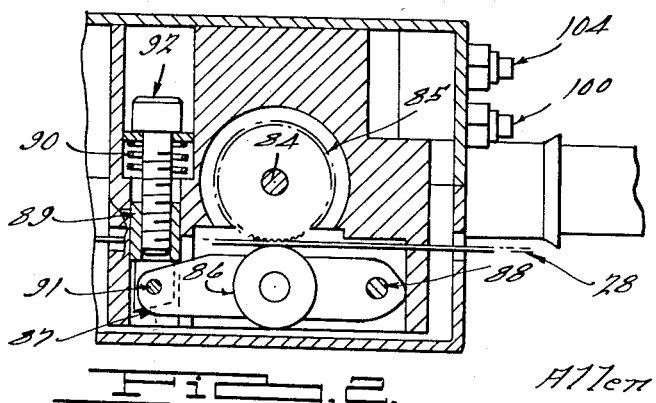
FIG. 2 is a cross sectional view taken substantially along the line 2—2 of FIGURE 1.

Drive of the filler wire 28 towards and away from the nozzle tip 42 is effected by a reversible D.C. electric motor M having an output shaft 84 with a drive roll 85 (FIGURE 2) at the upper end thereof. The wire 28 is engaged between the drive roll 85 and an idler roll 86. The idler roll 86 is supported by a bracket 87 that is pivotally supported by an upstanding pin 88 and normally biased clockwise about the pin 88, as seen in FIG. 2 of the drawings. An arm 89 is normally biased upwardly as seen in FIGURE 2 by a compression spring 90 and is connected to the bracket 87 by a pin 91. An adjustment screw 92 provides for adjustment of the bias of the spring 90 on the arm 89 and therefore of the idler roller 86 on the wire 28 against the drive roll 84.

Positive control of the D.C. electric motor M is effected, in a manner to be more particularly described hereinafter, through a tachometer-generator TG that is coupled to an opposite end 93 (FIG. 1) of the output shaft 84 by a belt 94 that extends between suitable pulleys 95 and 96 on the motor output shaft 84 and a tachometer shaft 97.

A plurality of normally open switches 100, 102 and 104 are mounted on the rear portion of the housing 22 and function as a manual filler wire advance override control, a manual wire feed control, and a manual wire retract control, respectively, as will be more fully described hereinafter. A manually operable sequence initiation switch 106 is mounted on the front portion of the housing 22 of the gun 20, the function of which will also be descirbed.

Figure 9:
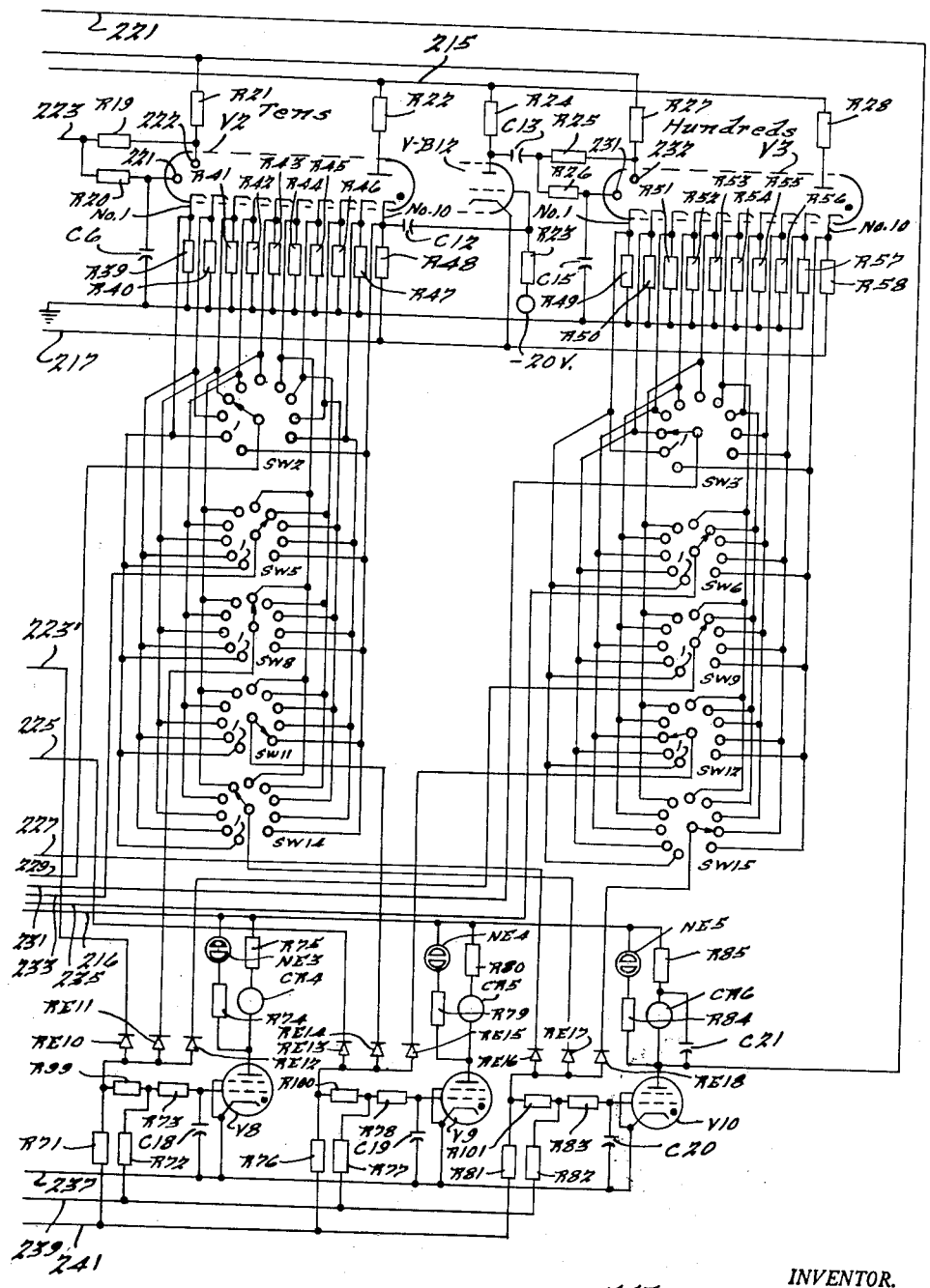
FIG. 9 is a schematic representation of another portion of the timer of FIG. 8.

The disclosed circuits include a motor control circuit depicted in FIG. 6 of the drawings which controls the wire-feed motor M, a control circuit depicted in FIGS. 5 and 6 of the drawings which controls a number of elements of the system including the motor control circuit of FIG. 6, and a timer depicted in FIGS. 8 and 9 which controls portions of the circuit of FIGS. 5 and 6. The circuits of FIGS. 5 and 6 will be described under the assumption that the contactor switch 2SW is in its illustrated "automatic" rather than "manual" position, in which switch 3SW is in its "start" position, as illustrated, rather than in its neutral "off" position or in its upper "continuous operation" position, in which timer switch 11SW is closed, in which the initial-slope switch 4SW (FIG. 6) is in its illustrated "strike" position rather than in its intermediate "off" position or in its lower "timer" position, in which the final slope switch 5SW is in its illustrated "automatic" position rather than in an "off" position and in which switch 8SW is closed. It will further be assumed that the jogging switches 102 and 104 are not actuated. The operation of the circuit with any of the switches in other positions will be apparent after and from the following description.

The circuits of FIGS. 5 and 6 are energized from a source S1 upon the closure of switch 1SW, establishing an energizing voltage difference between conductors 250 and 252. However, no operational action occurs until switch 106 is closed. It will be recalled from the description of FIGS. 1–4 that switch 106 is manually actuated.

The closure of switch 106 connects conductor 250 to conductor 256 thereby establishing an alternating voltage between conductors 256 and 252. The closure of switch 106 also completes a circuit from conductor 250 through normally closed contacts CR6a and through the winding of relay 3CR to conductor 252 as well as through normally closed contacts CR4a and through the winding of relay 11CR to conductor 252. Contacts CR6a and CR4a are contacts of the "spot time" relay CR6 and of the "wire stop delay" relay CR4 in the timer 254, as illustrated in detail in FIGS. 8 and 9, respectively, of the drawings.

The operation of relay 3CR (FIG. 6) results in the closure of contacts 3CRb thereof which completes a circuit from conductor 250 through the closed contact of switch 8SW through the normally and now-closed contacts CCRa of an arc current relay to be described, and through the winding of relay 1CR to conductor 252, thereby operating relay 1CR. The closure of contacts 3CRb also completes an energizing circuit for the welding contactor WPC.

The operation of relay 1CR results in the closure of the contacts 1CRa thereof to complete a circuit from conductor 250 through normally and now-closed contacts 18CRa, through the closed contacts of switch 3SW, through switch 9SW (assuming that switch to be closed) and through the winding of relay 7CR to conductor 252, thereby operating relay 7CR. The closure of contacts 1CRa also completes an energizing circuit for relay 4CR to operate that relay and the resultant closure of contacts 4CRa thereof completes a circuit from conductor 256, closed contacts of switch 2SW, contacts 4CRa, and through the winding of relay 5CR to conductor 252 to operate relay 5CR. Relay 5CR, in operating, closes its contacts 5CRa to complete a latching or locking circuit for itself so that it will remain operated even though relay 4CR later releases as long as switch 106 remains closed. It will be noted that although relay 5CR, in operating, closes its contacts 5CRb, the fact that relay 4CR is now operated and relay 18CR is now released prevents an energizing circuit from being completed for relays 6CR and 18CR at this time.

The aforesaid closure of contacts 1CRa also completes a circuit through normally and now-closed contacts 18CRa, the closed contacts of switch 3SW, contacts 3CRa, the closed contacts of switch 3SW, and through the winding of relay 10CR and unidirectional current conducting device 43RE to conductor 252 as well as through the "high-frequency unit" 258 to conductor 252.

It will therefore be seen that as a result of the operation of relay 3CR and the resultant operation of relay 1CR, contactor WPC, relay 7CR, relay 10CR and the "high-frequency unit" 258 are all energized.

The operation of the contactor WPC results in the closure of its contacts WPCa and WPCb (FIG. 7) to connect the source S2 to sustaining voltage derived from the source 260 and applied between the electrode 80 and the work.

The closure of contacts 10CRa resulting from the operation of relay 10CR completes the connection of the source S2 to the arc strike voltage source 270, thereby energizing that source 270. Source 270 is a conventional direct voltage source adapted to rectify the alternating voltage applied thereto from the source S2, to filter the rectified voltage, and to develop an output direct voltage between conductors 266 and 272, the latter being positive relative to the former. This voltage is of considerably higher amplitude than the voltage from source 260 and serves as an arc strike booster voltage during high frequency start. In the preferred practice, source 270 develops a direct voltage in the order of 130 to 150 volts between conductors 266 and 272. The conductor 266 is connected to the electrode 80 through the transformer secondary winding 268S and the voltage appearing on conductor 272 is applied through the now-closed contacts 7CRb to the work.

The high-frequency unit 258 comprises a generator of high-frequency signals serving as an ionizing voltage. The frequency of these signals is not critical and in a constructed arrangement, an arc-gap discharge oscillator was employed so that the high-frequency unit developed a variety of high-frequency signals. The high-frequency unit 258 is energized, as above discussed, by the application of the voltage between conductors 250 and 252 thereto and develops the output high-frequency signal across the primary winding 268P of a transformer 268, the secondary winding 268S (FIG. 6) of which is, as previously discussed, connected in series with the electrode 80.

Since the high-frequency unit 258 and relay 10CR are operated at the same time, both the arc strike booster voltage source 270 and the radio-frequency voltage to facilitate initial ionization of the gap are concurrently applied. Conditions are thereby established for initiating an arc.

When the arc strikes so that current is flowing from the arc voltage source 260, the arc strike booster voltage source 270 and the source of high frequency ionization are de-energized. This is accomplished by associating a saturable core reactor, having a winding 276, with the lead 264. Winding 276 is connected in series with an alternating current source S3 and the winding of a relay CCR. In the absence of current through conductor 264, winding 276 offers a sufficient impedance to alternating current flow to prevent energization of relay CCR. However, the flow of the arc current through the conductor 264 will produce saturation of the core associated with winding 276 to reduce the effective impedance of that winding and to permit relay CCR to operate.

When relay CCR operates, it opens its contacts CCRa (FIG. 6) to release relay 1CR. Relay 1CR, in releasing, opens its contacts 1CRa to release relay 7CR and de-energize relay 10CR as well as to disconnect the high-frequency unit 258 from its source of energizing alternating current. In this manner, the application of the high-frequency voltage is terminated and the arc strike booster voltage source 270 (FIG. 7) is disconnected from the nozzle 14. The source 270 is de-energized shortly thereafter upon the opening of contacts 10CRa, relay 10CR being slow-to-release by virtue of the provision of the rectifier 43RE connected in series with that winding and of a capacitor 278 connected in parallel therewith.

The release of relay 1CR and the resultant opening of contacts 1CRa also de-energizes relay 4CR. The resultant opening of contacts 4CRa does not change the state of relay 5CR since the contacts 5CRa of that relay are closed in shunt of contacts 4CRa. The closure of contacts 4CRb, now that contacts 5CRb are closed, completes energizing circuits for relays 6CR and 18CR as well as an energizing circuit via conductor 280 and through the closed contacts of switch 4SW for relay 8CR.

Relay 18CR, in operating, closes its contacts 18CRb to complete a locking circuit for relays 6CR and 18CR in shunt of contact 4CRb. Relay 6CR, in operating, closes its contacts 6CRa which serves to initiate the timing operation of the timer 254. This timer operates in a manner to be described to control the state and change of state of a number of the contacts in FIGS. 5 and 6 of the drawings.

It will be observed that normally closed contacts 18CRa of relay 18CR are included in the energizing circuits of relay 10CR and of the high frequency unit 258. If it were not for this inclusion, mis-timing could occur. Thus, if the arc has been struck so that relay 1CR is released and relay 6CR is operated to initiate timing, if thereafter the arc becomes extinguished, and if it were possible thereafter to restrike the arc, the actual arc time would be improperly short. However, with the disclosed circuitry, once relays 6CR and 18CR have operated to initiate timing, the resultant opening of contacts 18CRa prevents reoperation of relay 10CR and of the high frequency unit 258 which would otherwise occur in response to the releasing of relay CCR (when the arc extinguishes) and the resultant reoperation of relay 1CR. To restrike the arc, the operator must first release the switch 106 and then reclose the switch 106. By this procedure, relay 6CR is released and, the timer 254 is reset and the entire cycle is reinitiated, thereby insuring that the timer is reset to "zero" each time that the arc is struck.

As was above noted, relay 8CR (FIG. 7) was operated in response to the operation of relay 5CR and the subsequent release of relay 4CR. Relay 8CR controls the voltage source 260 and is an "initial slope" controlling relay. The circuits of the arc voltage source 260, including initial slope features, controlled by relay 8CR, and final slope control features, controlled by relay 9CR, are conventional.

It will be recalled that in initial response to the closure of switch 106 (FIG. 5), relay 11CR operated. Relay 11CR, in operating, opens its contacts 11CRa (FIG. 6) to disable the forward or feed manual control switch 102 (used for jogging purposes) and closes its contacts 11CRa to complete a circuit from conductor 256 through now closed contact 16CRb, rectifier 30RE and to the winding of relay 12CR to conductor 252. The winding of relay 12CR is shunted by capacitors 6C and 13C to render it slow-to-release for a purpose hereinafter to be noted. Relay 12CR, in operating, opens its contacts 12CRa to disable one energizing circuit for relay 14CR.

The closure of contacts 11CRa also completes a circuit from conductor 256 through contact 16CRb and through the winding of relay 13CR to conductor 252 as well as through rectifier 31RE and the winding of relay 15CR to conductor 252. As a result, both relays 13CR and 15CR are operated. These relays have contacts in the motor control circuit of FIG. 7 and serve to cause the motor M to advance the wire 28 (FIGS. 1–4) towards the bore 46 in the nozzle tip 42. This advance of the filler wire 28 continues until the wire makes electrical engagement with the metal of the nozzle tip 42. When this occurs, a circuit is completed from the voltage at the secondary winding of transformer 132 (FIG. 6), conductor 282, inductor 130, nozzle tip 42, wire 28, drive roll 85, wire 284, winding of relay 16CR, and back to the secondary winding of transformer 132. Thus, the engagement of the wire 28 with the metallic nozzle tip 42 completes an energizing circuit for relay 16CR.

Relay 16CR, in operating, opens its contacts 16CR$b$ to interrupt the energizing circuits for relays 13CR and 15CR, thereby terminating the feed or advance of the wire 28. The opening of contacts 16CR$b$ also terminates the energization of relay 12CR which, as above noted, is slow-to-release. At the end of the release period of relay 12CR, contacts 12CR$a$ close. While contacts 16CR$a$ are also closed at this time, contacts CR4$c$ are open so that no energizing circuit is completed for the retract relay 14CR. The wire 28 then remains in this position, just engaging the metal of nozzle tip 42.

The welder remains in this condition, with the arc struck, until the occurrence of the first timing event produced by the timer 254. Timer 254, as will be discussed further hereinafter, can time five separate intervals, all of which are initiated by the closure of contact 6CR$a$ (FIG. 6) and each of which can be set to any duration independent of the duration of any of the other timing intervals.

In the illustrative arrangement disclosed in FIGS. 5 and 6, five timing functions are or may be performed, the initial slope delay, that is, the time at which relay 8CR (FIG. 6) is operated to control the up-slope or initial slope period of the arc voltage source 260 (which in the illustrated setting of switch 4SW is not employed); the wire start delay period which is the delay between the initiation of timing and the time at which the wire 28 is advanced into the puddle; the wire stop delay period which is the interval between energization of the timer and the time at which the wire feed is terminated by releasing relays 13CR and 15CR (FIG. 6); the final slope delay period which is the interval between the energization of the timer and the actuation of relay 9CR (FIG. 6) to cause the arc voltage source 260 to initiate the final slope current characteristic; and the spot time period at which the welding cycle is terminated. As will be seen, the timer 254 includes five relays designated CR2 through CR6 and for purposes of illustration, relay CR2 has been assigned the initial slope delay function (not here performed) so that its contacts CR2$a$ (FIG. 6) are connectable to control the energization of relay 8CR; relay CR3 in the timer has been assigned the final slope delay function and hence its contacts CR3$c$ (FIG. 6) control the energization of the final slope relay 9CR; relay CR4 in the timer has been assigned the wire stop delay function and hence its contacts are utilized to control the wire feed and wire retract relays 13CR and 14CR; relay CR5 in the timer has been assigned the function of controlling the wire start delay period and hence its contacts CR5$a$ are also connected in energizing circuits for the wire feed and wire retract relays 13CR and 14CR; and relay CR6 in the timer has been assigned the over-all or spot time function and hence its contacts CR6$a$ are connected in the initiation circuit and control relays 3CR and 11CR, the latter of which is also controlled by contacts of the wire stop delay relay CR4.

The first effective one of the timing events to occur in the representative sequence is the actuation of the wire start delay relay CR5 in the timing circuit. The resultant closure of contacts CR5$a$ (FIG. 6) completes a circuit from conductor 256 through now-closed contact CR4$b$ to complete energizing circuits for relays 12CR, 13CR and 15CR. As will be described in connection with the motor control circuits of FIG. 7, this results in an advance of the wire 28 into the weld puddle. It will be observed that the wire 28 remains in electrical engagement with the nozzle tip 42 during this advance so that relay 16CR remains operated. The rate of advance of the wire is carefully selected and accurately controlled so that by controlling the duration of the feed the amount of wire 28 fed into the puddle can be accurately predetermined and preselected.

The wire 28 continues to be fed into the puddle until the wire stop delay relay CR4 in the timing circuit operates. The resultant opening of contacts CR4$a$ (FIG. 5) releases relay 11CR to open contacts 11CR$a$ (FIG. 6) and close contacts 11CR$b$ with no present effects. The resultant opening of contacts CR4$b$ (FIG. 6) terminates the energization of relays 12CR, 13CR and 15CR. The release of relays 13CR and 15CR terminates the forward or advancing operation of the motor M to terminate the feeding of the wire 28 into the puddle. The closure of contacts CR4$c$ prepares an energizing circuit for relays 14CR and 15CR. However, this circuit is not complete until the slow-to-release relay 12CR has released. When this occurs and the contacts 12CR$a$ close, a circuit is completed from conductor 256, contacts CR5$a$, contacts CR4$c$, contacts 12CR$a$, contacts 16CR$a$, and through the winding of relay 14CR to conductor 252 as well as through rectifier 33RE and the winding of relay 15CR to conductor 252. The operation of relays 15CR and 14CR energizes the motor M to retract the wire from the puddle. The purpose of connecting the contacts 12CR$a$ in this circuit is to insure an adequate time delay during which the motor can come fully to a halt. This is not imperative in all circuits, of course, but is here provided since in the preferred arrangement a permanent magnet motor M is employed which could become damaged if reverse currents were applied when the motor was still rotating in the forward direction.

The wire 28 continues to be withdrawn from the puddle until it is retracted from engagement with the nozzle tip 42, that is, until it is drawn out of the bore 46 therein and into the air gap 48. When this occurs, the previously described continuity circuit is interrupted and relay 16CR releases to open its contacts 16CR$a$ to release relays 14CR and 15CR to terminate the retracting operation of the motor M.

Thereafter, in the representative sequence, the final slope delay relay CR3 in the timer operates to operate the final slope relay 9CR (FIG. 6) to control the final or current period. Thereafter, the spot time relay CR6 in the timer circuit operates to open its contacts CR6$a$ (FIG. 5) to release relay 3CR. Relay 3CR, in releasing, opens its contacts 3CR$b$ to release the welding contactor WPC to terminate welding current, and produces the release of the other relays to restore the circuits to normal in preparation for the next cycle of operation.

The foregoing description pertains to the assumed high-frequency starting conditions.

The functioning of the equipment when the pilot arc mode of operation is utilized is identical to that above described except as expressly noted hereinafter.

In pilot arc operation, prior to the closing of switch 106, switch 8SW is operated so that each of its ganged elements is switched from its illustrated position to the opposite position and switch 3SW is turned to its "off" position. As a result, a circuit is completed from conductor 250 to the upper illustrated contact of switch 8SW and through the winding of the pilot arc relay 7CR to conductor 252 to operate that relay. The closure of the intermediate set of contacts of switch 8SW completes an energizing circuit for relay 10CR. The change of position of the lower illustrated contacts of switch 8SW, coupled with the closure of the intermediate set of contacts, completes an energizing circuit through contacts CCRa to operate relay 1CR.

The operation of relay 10CR results in the closure of contacts 10CRa (FIG. 6) to energize the source 270 of pilot arc voltage. The operation of relay 7CR opens contacts 7CRb (FIG. 6) to disconnect output conductor 272 from the work, and the operation of that relay results in the closure of contacts 7CRa to connect the output conductor 272 to the nozzle tip 42. This establishes a pilot arc sustaining voltage between the electrode 80 and the nozzle tip 42. To assist in starting the pilot arc, switch 9SW (FIG. 5) may be momentarily actuated to complete a circuit from conductor 250, through the upper set of contacts of switch 8SW, and through switch 9SW to the high-frequency unit 258. As soon as the pilot arc starts, switch 9SW is released.

The above noted operation of relay 1CR results in the closure of contacts 1CRa to complete an energizing circuit for relay 4CR. When the nozzle tip 42 is placed against the work, the pilot arc transfers so as to exist between the electrode 80 and the work. Due to current limiting features in the power supply 270 this is a low-current arc of the order of, for example, 5 amperes. When switch 106 operates, relays 3CR and 11CR operate. The operation of relay 11CR initiates the wire-feed operation to preselect the position of the wire tip 47, as above described, and the operation of relay 3CR produces closure of its contacts 3CRb to actuate the contactor WPC to energize the arc voltage source 260 (FIG. 6).

In the meantime, the operation of switch 106 has completed a circuit through the now-closed contacts 4CRa to operate relay 5CR.

When the arc voltage source 260 becomes effective to produce the full arc, relay CCR (FIG. 6) operates to open its contacts CCRa (FIG. 5) to release relay 1CR which releases relay 4CR. The resultant closure of contacts 4CRb completes an energizing circuit for relays 6CR and 18CR to initate the operation of the timer 254, as above described.

In the motor control circuit of FIG. 7 the alternating voltage induced across the secondary winding of transformer 7TA is full-wave rectified by means including rectifier 5V and is filtered by the network including capacitors 10C and 11C and resistor 20R to develop a direct voltage between conductors 150 and 152, the former of which is at a negative potential relative to the latter. This direct voltage is applied across serially interconnected resistor 21R and voltage regulating gas diodes 6V. The voltage appearing across the voltage regulator 6V is applied across a series circuit comprising variable resistor 13P, the resistive element of potentiometer 12P, and variable resistor 15P. The direct voltage appearing between the movable element of potentiometer 12P and conductor 150 is employed as a reference voltage to control the speed of the motor M in a manner to be described, and adjustable resistors 13P and 15P are utilized to adjust the maximum and minimum selectable speeds of the motor, respectively.

As noted from the prior description of the circuits of FIGS. 5 and 6, during either forward or reverse operation of the motor M, relay 15CR is operated, relay 17CR is released during the forward or feeding energization of motor M but it is operated during the retract operation of the motor, relay 13CR is actuated to feed the wire, and relay 14CR is actuated in lieu of relay 13CR to produce a retraction of the wire 28.

With relays 13CR and 15CR operated and relays 14CR and 17CR released to energize the motor M to feed or advance the wire, a circuit is completed from the movable element of the potentiometer 12P, contacts 15CRa, normally closed contacts 17CRa, through the tachometer generator TG, normally closed contacts 17CRb, contacts 15CRb, resistor 27R (shunted by capacitor 15C) and to the control grid of triode 7VB. The cathode of tube 7VB is connected to conductor 150 and the anode of that tube is connected through load resistor 23R to conductor 152. When the tachometer generator TG is being driven as a result of the energization of the motor M to feed the wire 28, it will develop a direct voltage such that its left hand terminal is positive relative to its right hand terminal, so that its output direct voltage is applied in opposition to or bucking relation with the positive reference potential.

If tachometer generator TG is being driven too slowly, a signal deviating from the preselected value in a positive direction is applied to the control grid of tube 7VB. The resulting drop in the plate potential of tube 7VB is directly coupled to the control grid of triode 7VA through resistor 25R. The anode of vacuum tube 7VA is connected to the positive potential on conductor 152 through load resistor 22R, while the cathode of that tube is at a positive potential established at the junction of resistors 26R' and 26R which are connected in series between the conductors 150 and 152. In a constructed embodiment, resistor 26R' was about ten times the size of resistor 26R so that the cathode of tube 7VA was at a fairly high positive value.

The reduction of the voltage of the control grid of tube 7VA reduces the conductivity of that tube and produces an increase in the voltage at the anode thereof due to the voltage drop across load resistor 23R. This voltage is applied through resistor 29R to the control grids of dual-triode 8V, the two sections of which are connected in parallel.

The cathodes of tube 8V are connected to conductor 152 to provide, in conjunction with the positive potential applied to the grids of tube 8V from tube 7VA, a negative bias. The anode circuit of tube 8V is energized from an alternating current source S3 (which may be the same source as those disclosed elsewhere in this application) via a transformer 7TB. The anodes of tube 8V are connected through rectifier 27RE to one terminal of the secondary winding of transformer 7TB and are also connected through rectifier 29RE and the primary winding of transformer 7TC to the other terminal of the secondary winding of transformer 7TB. The cathodes of tube 8V are connected to the left hand terminal of the secondary winding of transformer 7TB by means of a rectifier 26RE, and are connected to the upper terminal of the primary winding transformer 7TC via rectifier 28RE.

Tube 8V serves in effect as a variable resistance element to control the magnitude of the alternating current in the primary winding of transformer 7TC. When the left hand terminal of the secondary winding of transformer 7TB is positive, current flows through rectifier 27RE, through both sections of dual-triode 8V, through rectifier 28RE, and through the primary winding of transformer 7TC back to the secondary winding of transformer 7TB. When the right hand terminal of the secondary winding of transformer 7TB is positive, current flows through the primary winding of transformer 7TC, rectifier 29RE, through the paralleled sections of tube 8V, rectifier 26RE, and back to the secondary winding of transformer 7TB. The magnitude of this current flow will be determined by the potential at the control grid of tube 8V. Under the assumed conditions, the potential at the control grids of the sections of tube 8V will be higher than normal (in a positive sense) producing a relatively large current flow through the secondary winding of transformer 7TC.

The alternating current through the secondary winding of transformer 7TC is rectified by the full-wave bridge comprising rectifiers 22REa, 22REb, 22REc, and 22REd. The resultant positive potential appearing at conductor 156 is applied (under the assumption that relay 13CR is operated and relay 14CR is released, as above noted) through contacts 13CRa, the winding of motor M, and through contacts 14CRb and 13CRc to the negative potential appearing at the junction of rectifiers 22REc and 22REd. With generator TG running too slowly, the potential is relatively high, the magnitude of the current flow in this path will be large and motor M will be rotated at a higher speed. This will result in an increase in the output voltage of tachometer generator TG, producing a reduction in the potential at the control grid of vacuum tube section 7VB, an increase in the current flow through section 7VA, a reduction in the voltage at the control grids of dual-triode 8V, a corresponding decrease in the conductivity of that tube, a consequent reduction in the current through the primary and secondary windings of transformer 7TC, and a corresponding reduction of the energizing voltage for motor M, tending to reduce its speed. In this fashion, the speed of motor M is closely regulated to a preselected value.

In the event that relay 13CR is released and relay 14CR is operated to produce retracting movement of the motor M, it is necessary to reverse the polarity of tachometer generator TG to produce proper operation, and this is accomplished by operating relay 17CR in parallel with relay 14CR (as above noted) to effectively reverse the polarity of the connections to tachometer generator TG in the series circuit including the potentiometer 12P and the control grid of tube 7VB.

When relay 15CR is released (which, as above noted, occurs when neither relay 13CR nor relay 14CR is operated) the potentiometer 12P and the tachometer generator TG are disabled to control vacuum tube 7VB over the previously discussed circuit. Under these conditions, means including potentiometer 14P are effective to establish and maintain equilibrium conditions in the control circuits in preparation for the next operation. Thus, with relays 13CR, 14CR and 15CR all released, the positive potential appearing at the wiper of potentiometer 12P is applied through contacts 15CRc, through a portion of the resistive element of potentiometer 14P and the wiper thereof through contacts 15CRd and through resistor 27R to the control grid of tube 7VB. The resistive element of potentiometer 14P is connected between the positive and negative terminals of the full-wave bridge rectifier including elements 22REa–22REd, so that an opposing voltage is developed across the resistive element of that potentiometer. The resultant voltage is applied to the control grid of tube 7VB. If for any reason that voltage tends to be higher than that preselected by the settings of potentiometers 12P and 14P, increased current will flow through tube 8V, and an increased potential will be developed across the aforesaid full-wave bridge rectifier and applied across the resistive element of potentiometer 14P to reduce and control the magnitude of the voltage applied between the control grid and cathode of triode 7VB.

In practice, potentiometer 14P is desirably set so that the voltage applied to the control grid of tube 7VB is about the same as that which will be applied to that control grid when the tachometer generator TG is being driven at the speed selected by the setting of potentiometer 12P.

It will be observed that the voltage applied across the motor M is also developed across the potentiometer 14P when the motor is operating. In the disclosed arrangement, this voltage is not applied to the control grid of tube 7VB since contacts 15CRb are open when the motor M is running. If desired, a switch 8SW may be connected in series with the winding of relay 15CR (FIG. 6) to selectively disable that relay to operate. In that case, contacts 15CRa and 15CRb will not close, so that the tachometer generator TG will not be connected to tube 7VB, and relay contacts 15CRc and 15CRd will remain closed so that the voltage developed across a portion of the potentiometer 14P will be connected in series with the voltage selected by the potentiometer 12P to the control grid of tube 7VB. Therefore, in this arrangement, the feed-back signal will be derived from the armature voltage appearing across the motor M. It will be seen that by selectively enabling or disabling relay 15CR, the feed-back signal for regulation of the speed of the motor M may be derived either from a tachometer generator or from the armature voltage, as desired.

It will be observed that the energizing circuits for the motor M include not only normally open contacts 13CRa and 13CRb, of relay 13CR and normally open contacts 14CRa and 14CRc of relay 14CR, to produce the normal reversing operation, but also include normally closed contacts 13CRb and 14CRb, with the normally closed contacts 13CRb being connected in series with normally open contacts 14CRa and normally closed contacts 14CRb being connected in series with normally open contacts 13CRc and with the dynamic braking resistor 50R being connected to the junctions of those pairs of contacts. It is normally intended and expected that relays 13CR and 14CR will be energized only alternatively and in the circuits of FIG. 6 are so arranged. However, it is possible that in use, both relays would remain effectively operated at the same time either due to circuit malfunctioning, or more commonly, due to the closed contacts of one of the relays sticking or welding. This condition, of course, would produce a short circuiting of the power supply including the rectifiers 22REa through 22REd. To avoid this malfunctioning, it is customary to provide mechanically interlocked relays so that neither can operate unless the other is released. By virtue of the provision of the additional two sets of normally closed contacts 13CRb and 14CRb, the additional expense of providing mechanically interlocked relays is obviated. Thus, for example, if relay contacts 14CRa and 14CRc remain closed after the actual (due to contact welding) or ostensible (due to circuit malfunctioning) de-energization of relay 14CR, and if relay 13CR is thereafter operated to close contacts 13CRa and 13CRc, the power supply cannot be shorted through contacts 13CRa and 14CRa since contacts 13CRb are now open, and the power supply cannot be shorted through contacts 14CRc and 13CRc since contacts 14CRb are now open.

The program timer of FIGS. 8 and 9 comprises a driving amplifier V4, a plurality of timing amplifiers V5, V12A, and V12B, a plurality of counter tubes V1, V2 and V3, and a plurality of coincidence circuits including thyratrons V6, V7, V8, V9 and V10. In these circuits, a source of direct voltage is represented as a circle and it is to be understood that the other terminal of each such illustrated source is connected to ground.

The counters V1, V2 and V3 are representatively illustrated to be cold cathode glow transfer or stepping tubes which may, for example, be of the type manufactured by Ericson Telephone Ltd., of Great Britain, type GS10C. These tubes are commercially available in the United States of America. In general, each of these stepping tubes, such as stepping tube V1, comprises a plurality of cathodes designated as 1–10, inclusive, an anode 200 common to all those cathodes, and a first and second plurality of intermediate, transfer or guide electrodes interposed the main cathodes Nos. 1–10. Since the electrodes in each of these groups of intermediate electrodes are electrically interconnected, the two groups of electrodes are, for convenience of illustration, designated as single electrodes 211 and 212.

The anode 200 is connected through resistor R15 to a source of positive direct potential on conductor 215, the main cathodes Nos. 1–9 are connected to ground through individual load resistors R29–R37, and main cathode No. 10 is connected to "zero" line 217 through resistor R38. The tube is designed so that with the properly selected value of resistor R15, discharge can be supported, at any one time, between the anode and but one of the main cathodes Nos. 1–10 so that the tube will commutate. The discharge path is advanced so that it exists between the anode and the successive cathodes by applying suitable pulses to the transfer or guide electrodes 211 and 212, the direction of advance being selected by the sequence of pulsing of those two groups of electrodes.

In the disclosed arrangement, the tube is initially set so that conduction exists between anode 200 and main cathode No. 10, and the discharge path is advanced from cathode to cathode in numerical order, the discharge first transferring from cathode No. 10 to cathode No. 1, thence to cathode No. 2 and so forth. This is accomplished by applying a pulse to transfer electrodes 212 slightly in advance of the application of a pulse to transfer electrodes 211. It will be appreciated that other forms of counting devices may be employed, that other forms of cold cathode gaseous discharge counting tubes may be employed, and that if the direction of discharge advance is established inherently in the tube by the construction and configuration of the cathodes or otherwise, the necessity for providing two time-phased input pulses can be avoided.

As will be seen, the function of tube VI and of the other counter tubes disclosed, is to count a plurality of serially received input pulses and to transmit output signals whenever selected numbers of those pulses have been received. The sixty-cycle alternating line source is utilized as a pulse source in the present system so that the counters in effect count cycles of the sixty-cycle line frequency.

Prior to the closure of switch SW11, relay CR1 is released and its contacts CR1c are open. Consequently, a potential of approximately 150 volts negative (relative to ground) is applied to the "zero line" 217. As a result, the No. 10 cathodes of the counter tubes V1, V2 and V3 are returned to a source of quite negative potential relative to the ground potential to which the other cathodes of those tubes are returned. This selective application of a high negative potential to the No. 10 cathodes, in conjunction with the application of the high negative potential to the other elements connected to the zero line (as will become apparent from the ensuing description) results in each of the counter tubes being initially set to a condition in which the conduction exists between the anode and the No. 10 cathode thereof.

When line switch SW11 is closed, the source of alternating potential S5 is connected across the primary windings of transformers T1 and T2, with no present operational effect. However, when the initiating switch or contacts 6CRd are closed, the energizing circuit for relay CR1 is completed and that relay operates. Relay CR1, upon operating, closes its contacts CR1a to connect a positive direct voltage to conductor 216 over which it is supplied through load resistor R7 to the anode of thyratron V4, through resistor R65 and the winding of relay CR2 to the anode of thyratron V6, through resistor R70 and the winding of relay CR3 to the anode of thyratron V7, through resistor R75 and the winding of relay CR4 to the anode of thyratron V8, through resistor R80 and the winding of relay CR5 to the anode of thyratron V9, through resistor R85 and the winding of relay CR6 to the anode of thyratron V10, and across a voltage divider circuit to be described. Relay CR1, in operating, also closes its contacts CR1c to connect the "zero line" to ground to relieve the normalizing signal and enable the circuit to operate.

When the circuit is in operation, pulses derived from the alternating voltage supply are applied to the transfer electrodes of the counter tube V1 by means including tube V5. Tube V5 is a pentode, the cathode and suppressor grid of which are grounded, the anode of which is connected through plate resistor R11 to a positive direct voltage on conductor 214 and the screen grid of which is connected through the secondary winding of transformer T2 in series with resistor R3 to a source of negative potential indicated on the drawings to have a magnitude of a negative 100 volts. Transformer T2 is preferably a peaker type transformer in which the core has an air gap so that there will be no effective breakdown of flux thereacross until the voltage appearing across the primary winding reaches a preselected value. This feature, coupled with the application of a large negative biasing voltage through resistor R3, results in the application of a positive pulse of energy to the screen grid of vacuum tube V5 at, or approximately at, the 90 degree point on the positive half-cycle of the alternating voltage wave form appearing across the primary winding of transformer T2. However, for reasons that will become apparent hereinafter, it is desirable that no such pulses be applied to the screen grid of tube V5 unless the coincidence circuit including thyratron V10 is non-conductive. Therefore, the screen grid of tube V5 is connected through resistor R8 to the anode of thyratron V10. If thyratron V10 is conductive, its anode potential is lower than the potential on conductor 216 due to the drop across resistor R85 and the winding of relay CR6, and the algebraic sum of the negative one hundred volt potential applied through resistor R3, of the relatively low positive potential applied through resistor R8, and of the positive pulse developed across the secondary winding of transformer T2 is not sufficient to cause vacuum tube V5 to produce the requisite output signal, even if other conditions are met. However, if thyratron V10 is extinguished, the positive potential at its anode is substantially equal to the positive potential on conductor 216 and the resultant voltage is applied through resistor R8 to the screen grid of vacuum tube V5 and is such that the algebraic sum of the voltages applied to that screen grid at the positive peak of the voltage developed across transformer T2 is sufficient to actuate tube V5. Thus, non-conductivity of thyratron V10 is a condition precedent to the effective operation of vacuum tube V5.

The circuits connected to the control grid tube V5 also establish another condition precedent to its effective operation. Thus, that control grid is connected to a source of negative potential (representatively negative 20 volts) through the resistance network comprising resistors R9 and R10, and is connected to ground through the cathode resistor R6 of thyratron V4 and uni-directional current conducting device RE19. When thyratron V4 is non-conductive, therefore, a negative bias is applied between the control grid and cathode of vacuum tube V5 to prevent the effective production of output signals by that tube.

Thyratron V4 is initially disabled because its plate circuit is open at contact CR1a of relay CR1. When relay CR1 operates, closing contacts CR1a, the output circuit of thyratron V4 is energized, but thyratron V4 will not immediately fire due to a provision of a short time delay to ensure that relay CR1 has operated and that any chattering of its contacts have dissipated to prevent any improper operation of vacuum tube V5. Thus, the alternating voltage applied across the primary winding of transformer T1 upon the closure of switch SW11 will induce an alternating voltage across the secondary winding of that transformer which is applied across serially interconnected resistors R1 and R2. The voltage across resistor R1 is half-wave rectified by means including rectifier RE1, which is connected in series with normally-closed contacts CR1b of relay CR1. This rectified voltage is filtered by and developed across resistor R4 in parallel with capacitor C1, and the polarization of rectifier RE1 is such that the right hand terminal of resistor R4 will be negative relative to the left hand terminal thereof. The alternating voltage appearing across resistor R2 is applied in series with the negative direct voltage appearing across resistor R4 to the control grid of thyratron V4 through current limiting resistor R5. The magnitude of the direct voltage across resistor R4 is sufficient to prevent tube V4 from firing even with plate voltage applied. When relay CR1 operates to open contacts CR1b, the rectifying circuit including rectifier RE1 is disabled, but a hold-off voltage will continue to be applied to the control grid of thyratron V4 until capacitor C1 is adequately discharged through resistor R4. When the charge on capacitor C1 is dissipated to a preselected value, thyratron V4 will be fired as the alternating voltage across resistor R2 increases in a positive direction. In the preferred arrangement, transformers T1 and T2 are so connected that the voltage at the upper end of the secondary winding of transformer T2 is 180 degrees out of phase with voltage at the upper end of the secondary winding of transformer T1. Thus thyratron V4 will be fired during a half cycle of the supply during which no positive pulse is being applied to the screen grid of tube V5. In this fashion, thyratron V4 is fired approximately 180 degrees before the next positive pulse will be applied to the screen grid of tube V5.

When thyratron V4 fires, the potential at its cathode rises due to the potential drop across resistor R6, correspondingly raising the potential at the junction of resistors R9 and R10 and thereby applying a voltage to the tube V5 which will enable that tube to operate in response to the positive pulses applied to its screen grid.

After the foregoing conditions precedent to the effective operation of vacuum tube V5 are met, a negative-going pulse will appear at the anode of tube V5 at each positive pulse supplied to the screen grid thereof. These negative-going pulses are applied through capacitor C4 and through serially interconnected resistors R12 and R14 to a source of relatively low positive potential. Since transfer cathodes 212 are connected at the junction of resistors R12 and R14, their potential will be sharply reduced at each such pulse, producing a transfer of the discharge within the counter tube V1 so that it exists between the anode 200 and the transfer electrode 212 which is adjacent the last conducting cathode, in the initial condition, cathode No. 10.

Each of the series of negative-going pulses at the anode of tube V5 is further applied through capacitor C4, resistor R13, and capacitor C6 to ground, with the transfer electrodes 211 being connected to the junction of resistor R13 and capacitor C6. The time constant of the network including elements R13 and C6 is selected so that the application of a negative-going pulse to the transfer electrodes 211 will be delayed for an appropriate interval relative to the time that the pulses are applied to the transfer electrodes 212. At each such application, the discharge path in tube V1 is transferred so that it exists between the anode 200 and the next adjacent transfer electrode 211 and, upon the termination of the negative pulse to transfer electrodes 211, conduction is established between anode 200 and the next succeeding main cathode, following initial condition, cathode No. 1. Successive pulsing of transfer electrodes 212 and 211 will cause the conductive path to advance along the series of main cathodes.

At the tenth input pulse, the conductive path will be transferred so that it exists between the anode 200 and the No. 10 cathode of "units" counting tube V1. The resultant sudden increase in the potential at that cathode results in the application of a positive pulse to the control grid of vacuum tube V12A via the network comprising capacitor C8 and resistor R17. In response thereto, vacuum tube V12A will apply a negative pulse to transfer electrodes 222 of the "tens" counter V2 by means of the network including capacitor C9 and resistors R19 and R21 and will, a short delay thereafter, apply a negative-going pulse to the transfer electrodes 221 of the counter tube V2 by means including capacitors C9 and C11 and resistor R20. In response to these time-spaced pulses applied to transfer electrodes 222 and 221 of the tens counter tube V2, the conductive path therein will be transferred so that it exists between the anode and the No. 1 cathode thereof.

The next succeeding or eleventh input pulse will cause the conductive path in the "units" counter tube V1 to again step to the No. 1 cathode of that tube and succeeding pulses will cause the units tube V1 cyclically to count. Each time that the conductive path in the tube includes the No. 10 cathode of that tube, an output or "carry" pulse will be transmitted to advance the conductive path in the "tens" counter tube V2 one step.

At the hundredth input pulse, the conductive path in the "tens" tube V2 will be advanced to exist between the anode and the No. 10 cathode thereof, which will cause a positive pulse to be applied to the control grid of tube V12b which will result in the application of a counting signal to the "hundreds" counter tube V3 in a manner similar to that above described. In this fashion, one-thousand input pulses can be counted by providing units, tens and hundreds counter tubes cascaded as illustrated.

Each of the cathodes of the "units" counter tube V1 is connected to each corresponding stationary contact of each of a plurality of selector switches SW1, SW4, SW7, SW10 and SW13, each of the main cathodes of the "tens" counter tube V2 is connected to a corresponding one of the stationary contacts of a plurality of selector switches SW2, SW5, SW8, SW11 and SW14, and each of the main cathodes of the hundreds tube V3 is correspondingly connected to each corresponding stationary contact of each of a plurality of selector switches SW3, SW6, SW9, SW12 and SW15.

The coincidence circuits including thyratrons V6–V10 serve to detect the concurrence of conductivity at each of three selected main cathodes of the three counter tubes V1, V2 and V3. Thus, each of the thyratrons V6–V10 will be fired at an individually preselectable count. Each of these coincidence circuits, such as the coincidence circuit including thyratron V6, includes three uni-directional current conducting devices such as diodes RE4, RE5 and RE6 which may be characterized as the "units," "tens," and "hundreds" diodes in that they are connected through the stepping switches to selected cathodes of the "units," "tens," and "hundreds" counter tubes V1, V2 and V3. Diode RE4 is connected to the wiper of selector switch SW1 which, in the illustrated setting, is connected to the No. 4 stationary contact of that selector switch and hence is connected to the No. 4 cathode of counter tube V1. Diode RE5 is connected to the wiper of selector switch SW2, which in the illustrated setting, is connected to the No. 3 contact of that switch and hence to the No. 3 cathode of the "tens" counter tube V2, and diode RE6 is connected to the wiper of switch SW3 which is shown to be positioned in association with the No. 2 contact thereof and hence is connected to the No. 2 main cathode of tube V3. As a result, in the illustrated settings, thyratron V6 is arranged to be fired at the two-hundred and thirty-fourth input pulse. The setting, of course, is purely arbitrary and may be varied as desired in accordance with the timing functions sought to be performed.

Similarly, the diodes RE7, RE8 and RE9 are associated with selector switches SW4, SW5 and SW6 so that thyratron V7 will be fired, as a representative example, at a different preselected total count of the input pulses. Thyratrons V8, V9 and V10 are also elements of coincidence circuits including individual diodes connected to individual selector switch banks in a corresponding fashion.

Since relay CR1 is operated, a circuit is completed from a source of positive 200 volt potential, through contacts CR1a, conductor 216, resistor R59, and resistor R60, to ground through contacts CR1c. As a result, a positive potential appears at conductor 224. At any time that the main cathode to which diode RE4, RE5, or RE6 is not an element of the conductive path in that counter tube, that cathode is essentially at ground potential and current will flow from conductor 224, through resistor R61, through that diode, to that cathode and to ground through the cathode resistor. In the preferred arrangement, resistor R61 has a quite high value of resistance so that the voltage appearing at the cathodes of the diodes RE4–RE6 under this circumstance is quite low. This relatively low positive potential is applied in series with a negative 20 volt potential across voltage dividing resistors R97 and R62 and the resulant voltage appearing at the junction of resistors R97 and R62 is applied through current limiting resistor R63 to the control grid of thyratron V6. The magnitude of this potential is insufficient to fire thyratron V6, and the parameters of the circuits are selected so that the potential applied to the control grid of thyratron V6 will not be adequate to permit that thyratron to fire as long as the cathode to which any one of the rectifiers RE4–RE6 is connected is not an element of the conductive path in the associated counter tube. Therefore, in the illustrated arrangement, at, but only at the preselected count, all three of the counter-tube cathodes to which the diodes RE4–RE6 are then selectively connected are supporting conduction and are at a potential which is positive relative to ground. As a result, rectifiers RE4–RE6 wil present an appreciably higher impedance to the flow of current from conductor 224 through resistor R61 via the previously traced circuits. The voltage drop across resistor R61 will accordingly fall and the potential applied to the control grid of thyratron V6 will correspondingly rise to a value sufficient to fire that thyratron. When thyratron V6 fires, relay CR2 included in its place circuit, will be energized and will remain energized until relay CR1 is released.

In a similar manner, thyratron V7 will be fired at a preselected count to operate relay CR3, thyratron V8 will be actuated at a preselected count to operate relay CR4, thyratron V9 will be actuated at a preselected count to operate relay CR5, and thyratron V10 will be actuated at a preselected count to energize relay CR6.

The sharp reduction in plate potential of thyratron V10 resulting from the conductivity thereof, is applied to resistor R8 to terminate the operation of vacuum tube V5. This terminates operation of the counting circuit. Therefore, while the contacts of relays CR2–CR6 may be connected in any fashion to perform any desired function and while there is no necessary order in which those relays become operated, resistor R8 should be connected to the anode of the last one of the employed thyratrons which is to be fired. With the illustrated connection, it is assumed that relay CR6 is to operate at the highest count.

From the foregoing description, it should be apparent that the arc welding apparatus of the present invention presents a material advance in the welding art. The arc welder provides an improved support for a tungsten nonconsumable electrode that precludes warping of the electrode upon heating thereof. After an arc is struck between the electrode and the workpiece to puddle the workpiece, a filler wire is fed into the weld puddle to replace metal which falls, sags or burns away or, in an alternative application, to add metal to the workpiece for the purpose of, for example, balancing the workpiece. Alternatively, the filler wire may be used to fill a weld crater or to improve the metallurgical characteristics of the weld.

The welding apparatus of the present invention includes a nozzle that is relatively efficiently cooled by a liquid coolant, for example water, that is brought into close heat transfer relation with those parts of the gun exposed to high temperatures, namely, the nozzle and the electrode supporting collet. The nozzle includes a tip that is readily removable without requiring disconnection of the coolant lines.

The wire feed mechanism is supported entirely within the handle of the welding gun thereby to render the gun completely flexible for use in close quarters, for example, within the wing panels of an aircraft. The only connections between the gun and external portions of the welding apparatus is by the flexible members that provide for the flow of coolant and for energization of the welding and drive apparatus therein.

The welding apparatus of the present invention also features a novel-ended collet that supports the electrode at two axially spaced points thereby to preclude flexure of the electrode due to the intense thermal stresses to which it is subjected. It is also to be noted that the collet structure of the present invention accepts tubular electrodes wherein a gas flows axially and centrally of the electrode towards the weld puddle. No modification of the welding apparatus is required to condition it for the acceptance of hollow or solid electrodes since the hexagonal configuration of the collet retainer provides for gas flow to the open rear end of the hollow electrodes, the gas then flowing axially outwardly toward the weld puddle.

It is also to be noted that the collet is readily removable from the welding gun so that collets of varying capacity can be interchanged. Since it is desirable that the electrode be relatively easily adjustable axially with respect to the workpiece, only a single component, namely, the collet retainer, must be backed off to provide for axial movement of the electrode. If it is desired to remove the electrode, only the collet retainer must be removed from its threaded engagement with the barrel whereupon the electrode can be pushed axially outwardly of the collet and removed from the welding gun.

Since a welding apparatus in accordance with the present invention provides for the feeding of controlled increments of wire into the weld puddle, the prevention of slippage between the drive roll and wire is imperative. Accordingly, another feature is the provision for micrometer adjustment of the bias of the idler roll on the filler wire and drive roll thereby to maintain positive drive between the wire and drive roll and preclude slippage therebetween.

Yet another feature of the present invention is the isolation of the nozzle from the electrode holding structure of the welding gun thereby to minimize heat transfer therebetween. Also, the nozzle is provided with a closed cooling system, the nozzle tip being engaged therewith in a tapered seating relationship to provide for optimum heat transfer between the tip and the nozzle. It is to be noted that the tip can be removed from the nozzle without affecting the cooling system.

It is to be understood that the specific construction of the improved welding apparatus herein disclosed and described is presented for the purpose of explanation and illustration and is not intended to indicate limits of the invention, the scope of which is defined by the following claims.

What is claimed is:

1. In an arc welding apparatus wherein an arc is drawn between a nonconsumable electrode and a workpiece, a nozzle having an aperture therein for the acceptance of the non-consumable electrode, and collet means for gripping and supporting the electrode at two separate and substantially axially spaced points to maintain a preselected relationship between the non-consumable electrode and said nozzle.

2. In an arc welding apparatus wherein an arc is drawn between a nonconsumable electrode and a workpiece, a nozzle having an aperture therein for the acceptance of the nonconsumable electrode, and means for supporting the electrode to maintain a preselected relationship between the nonconsumable electrode and said nozzle comprising a double ended collet for gripping the nonconsumable electrode at two separate and substantially axially spaced points.

3. In an arc welding gun including a nozzle having an aperture for the acceptance of a nonconsumable electrode, means on the gun for supporting said electrode to maintain a preselected relationship between the nonconsumable electrode and the nozzle comprising a pair of collet seats having central apertures, respectively, for the acceptance of the nonconsumable electrode and a double ended collet extending between said collet seats and radially contractable at each end to grip the nonconsumable electrode at two separate and substantially axially spaced points upon relative movement of said collet seats toward one another.

4. In an arc welding gun including a nozzle having an aperture for the acceptance of a nonconsumable electrode, means on the gun for supporting said electrode to maintain a preselected relationship between the nonconsumable electrode and the nozzle comprising a pair of oppositely directed conical collet seats having central apertures, respectively, for the acceptance of the nonconsumable electrode and a double ended collet having conical opposite end portions complementary to said collet seats and extending therebetween, the opposite end portions of said collet being radially contractable to grip the nonconsumable electrode at two separate and substantially axially spaced points upon relative movement of said collet seats toward one another.

5. In an arc welding gun including a nozzle having an aperture for the acceptance of a nonconsumable electrode, means on the gun for supporting said electrode to maintain a preselected relationship between the nonconsumable electrode and the nozzle comprising a tubular barrel having a hollow conical collet seat at one end thereof, a collet retainer threadably engaged with the other end of said barrel and having a hollow conical collet opposed to the collet on said barrel and a tubular collet having conical opposite end portions complementary to said collet seats, the opposite end portions of said collet having a plurality of axially extending slots therein so as to be radially contractable to grip the nonconsumable electrode at two separate and substantially axially spaced points upon advancement of said collet retainer toward the collet seat on said barrel.

6. A collet for holding an elongated member at two axially spaced points to preclude flexure thereof, said collet comprising a tubular barrel having a hollow conical collet seat at one end thereof, a collet retainer threadably engaged with the other end of said barrel and having a hollow conical collet seat opposed to and aligned with the collet seat on said barrel, and a tubular collet having conical opposite end portions complementary to said collet seats, the opposite end portions of said collet having axially outwardly extending slots therein, respectively, so as to be radially contractable to grip the elongated member at two separate and substantially axially spaced points upon advancement of said collet retainer towards the collet seat on said barrel.

7. A collet for holding an elongated cylindrical member at two axially spaced points to preclude flxure thereof, said collet comprising a tubular barrel having a conical collet seat at one end thereof, said collet seat having a central aperture for the acceptance of the cylindrical member and the conical section thereof being axially divergent towards the other end of said barrel, a collet retainer threadably engaged interiorly of the other end of said barrel as to be axially advanceable thereof upon relative rotation therebetween, said collet retainer having a conical collet seat opposed to and aligned with the collet seat on said barrel with a central aperture for the acceptance of the cylindrical member, and a tubular collet having conical opposite end portions complementary to said collet seats, the opposite end portions of said collet having axially outwardly extending radial slots therein, respectively, so as to be radially contractable to grip the elongated member at two separate and substantially axially spaced points upon advancement of said collet retainer towards the collet seat on said barrel.

8. In an arc welding apparatus wherein an arc is drawn between a nonconsumable electrode and a workpiece, a nozzle having an aperture therein for the acceptance of the nonconsumable electrode, means for supporting the electrode in a preselected electrically spaced relationship with said nozzle, and cooling means for said nozzle and supporting means comprising a cooling chamber in said nozzle, a cooling coil having a plurality of convolutions wound about said electrode supporting means, and electrically nonconductive means connecting said cooling chamber and cooling coil in fluid flow relationship.

9. In an arc welding apparatus in which filler wire is supplied to the weld puddle, a tubular metallic nozzle having an aperture in a side wall thereof, a nonconsumable electrode extending into said nozzle, means for advancing a filler wire through the aperture in the side wall of said nozzle into preslected relationship with said electrode, and means for gripping and supporting said electrode at two separate and substantially axially spaced points to maintain said preselected relationship.

10. In an arc welding apparatus in which filler wire is supplied to the weld puddle, a tubular metallic nozzle having an aperture in a side wall thereof, a nonconsumable electrode extending into said nozzle, means for advancing a filler wire through the aperture in the side wall of said nozzle into preselected relationship with said electrode, and means for gripping and supporting said electrode at two separate and substantially axially spaced points to maintain said preselected relationship comprising a pair of oppositely directed conical collet seats having central apertures, respectively, for the acceptance of the nonconsumable electrode and a double ended collet having conical opposite end portions complementary to said collet seats and extending therebetween, the opposite end portions of said collet being radially contractable to grip the nonconsumable electrode at two separate and substantially axially spaced points upon relative movement of said collet seats toward one another.

11. In an arc welding apparatus wherein an arc is drawn between a nonconsumable electrode and a workpiece to puddle the workpiece and including means for feeding a filler wire into a weld puddle, the improvement comprising a nozzle having apertures therein for the acceptance of the nonconsumable electrode and the filler wire, respectively, and means for gripping and supporting the electrode at two separate and substantially axially spaced points to maintain a preselected relationship between the nonconsumable electrode, nozzle, and filler wire, said filler wire being electrically insulated from said nozzle and having a tip portion engageable with said nozzle and circuit means including said filler wire and said nozzle for controlling the means for feeding said wire into the weld puddle in the workpiece.

12. In an arc welding apparatus including means for drawing an arc between a nonconsumable electrode and a workpiece to puddle the workpiece and means for feeding a filler wire into the weld puddle, the improvement comprising a nozzle having apertures therein for the acceptance of the nonconsumable electrode and the filler wire, respectively, means for supporting the electrode to maintain a preselected relationship between the electrode, nozzle, and circuit filler wire, and means for controlling the means for feeding a filler wire into the weld puddle comprising means for effecting electrical engagement and disengagement of said wire with said nozzle including an electrically conductive tube for the support and guidance of said wire, said tube being electrically spaced from said nozzle and electrically connected to said wire and to said feeding means whereby an electrical circuit between said nozzle, wire and tube and feeding means is interrupted upon retraction of said wire from within its complementary aperture in said nozzle.

13. In an arc welding gun including means for drawing an arc between a nonconsumable electrode and a workpiece to puddle the workpiece and wherein a filler wire is supplied to the weld puddle, a gun housing, means for advancing the filler wire into preselected relationship with said electrode comprising a drive motor disposed within said gun and having a drive roll engageable with the wire, and a tachometer generator disposed within said gun housing and driven by said motor, the axes of rotation of the motor and generator armatures being arranged in spaced generally parallel relationship to minimize the size of said wire advance means.

14. In an arc welding gun including means for drawing an arc between a nonconsumable electrode and a workpiece to puddle the workpiece and wherein a filler wire is supplied to the weld puddle, a gun housing, a hollow nozzle on the gun and having an aperture in a side wall thereof, and means for advancing a preselected increment of the filler wire through the aperture in the side wall of said nozzle into preselected relationship with said electrode comprising a drive motor disposed within said gun housing and having a drive roll engageable with the wire, and a tachometer generator disposed within said gun housing and driven by said motor, the axes of rotation of the motor and generator armatures being arranged in spaced transversely aligned generally parallel relationship to minimize the size of said welding gun.

15. In a portable arc welding gun including means for drawing an arc between a nonconsumable electrode and a workpiece to puddle the workpiece and wherein a filler wire is supplied to the weld puddle, and means for advancing the filler wire into preselected relationship with said electrode comprising a drive motor having a tachometer generator drivingly coupled thereto, said drive motor and tachometer generator being completely housed within the handle of said arc welding gun.

16. In an arc welding apparatus wherein an arc is drawn between a nonconsumable electrode and a workpiece, a nozzle having an aperture therein for the acceptance of the nonconsumable electrode, means for supporting the electrode in a preselected electrically spaced relationship with said nozzle including a tube and a double ended collet within said tube for gripping the nonconsumable electrode at two separate and substantially axially spaced points, and cooling means for said nozzle and supporting means comprising a cooling chamber in said nozzle, a cooling coil having a plurality of convolutions wound about said tube, and electrically nonconductive means connecting said cooling chamber and cooling coil in fluid flow relationship.

17. In an arc welding gun including means for drawing an arc between a nonconsumable electrode and a workpiece to puddle the workpiece and wherein a filler wire is supplied to the weld puddle, a gun housing, a body member within said housing and having a bore therein, a tubular barrel seated in said bore in said housing and having a conical collet seat at one end thereof, said collet seat having a central aperture for the acceptance of the nonconsumable electrode and the conical section thereof being axially divergent towards the other end of said barrel, a collet retainer threadably engaged interiorly at the other end of said barrel as to be axially advanceable thereof upon relative rotation therebetween, said collet retainer having a conical collet seat opposed to and aligned with the collet seat on said barrel with a central aperture for the acceptance of the nonconsumable electrode, a tubular collet having conical opposite end portions complementary to said collet seats, the opposite end portions of said collet having axially outwardly extending radial slots therein, respectively, so as to be radially contractable to grip the nonconsumable electrode at two separate and substantially axially spaced points upon advancement of said collet retainer toward the collet seat on said barrel, a hollow nozzle on the gun and having an aperture in the side wall thereof, a support member disposed between and engaging said nozzle and said collet seat, means for supporting said nozzle with respect to said body member, and means for advancing a preselected increment of the filler wire through the aperture in the side wall of said nozzle in preselected relationship with said electrode comprising a drive motor disposed within said gun housing and supported by said body member and having a drive roll engageable with the wire, a tachometer generator disposed within said gun housing and supported by said body member and driven by said motor, the axes of rotation of the motor and generator armatures being arranged in spaced transversely aligned generally parallel relationship to minimize the size of said welding gun, means including said tachometer generator for controlling the speed of said motor, and means including said nozzle and the filler wire for controlling the operation of said motor.

References Cited in the file of this patent
UNITED STATES PATENTS

| | | |
|---|---|---|
| 1,589,017 | Lincoln | June 15, 1926 |
| 2,358,158 | Gibbert | Sept. 12, 1944 |
| 2,360,160 | Pickhaver | Oct. 10, 1944 |
| 2,550,495 | Pilia | Apr. 24, 1951 |
| 2,681,401 | Anderson | June 15, 1954 |
| 2,719,245 | Anderson | Sept. 27, 1955 |
| 2,721,923 | Anderson | Oct. 25, 1955 |
| 2,768,280 | Renaudie | Oct. 23, 1956 |
| 2,791,673 | Arnaud | May 7, 1957 |
| 2,873,355 | Schaefer et al. | Feb. 10, 1959 |